US008451715B1

(12) United States Patent
Doshi et al.

(10) Patent No.: US 8,451,715 B1
(45) Date of Patent: May 28, 2013

(54) AVOIDING DATA LOSS IN A MULTI-HOMED LAYER TWO BRIDGING NETWORK

(75) Inventors: Sanjiv Doshi, San Jose, CA (US); Apurva Mehta, Cupertino, CA (US); Jagadish Grandhi, Mountain View, CA (US); Bin Hong, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 312 days.

(21) Appl. No.: 12/827,464

(22) Filed: Jun. 30, 2010

Related U.S. Application Data

(60) Provisional application No. 61/318,199, filed on Mar. 26, 2010.

(51) Int. Cl.
*H04J 1/16* (2006.01)
(52) U.S. Cl. .......................... 370/218; 370/242; 370/401
(58) Field of Classification Search .......... 370/216–253, 370/401
See application file for complete search history.

(56) References Cited

U.S. PATENT DOCUMENTS

| | | | |
|---|---|---|---|
| 7,379,429 B1 | 5/2008 | Thottakkara | |
| 7,502,376 B2 | 3/2009 | Vereecke et al. | |
| 7,720,011 B1 | 5/2010 | Thottakkara | |
| 7,724,745 B1 | 5/2010 | Elangovan et al. | |
| RE42,253 E | 3/2011 | Thottakkara | |
| RE43,270 E | 3/2012 | Thottakkara | |
| 8,139,510 B2 | 3/2012 | Thottakkara | |
| 2006/0098581 A1* | 5/2006 | Kenghe | 370/252 |
| 2007/0263554 A1 | 11/2007 | Finn | |
| 2008/0159309 A1 | 7/2008 | Sultan et al. | |
| 2009/0141622 A1* | 6/2009 | Bitar | 370/225 |
| 2009/0274155 A1 | 11/2009 | Nakash | |
| 2010/0039934 A1* | 2/2010 | McGuire et al. | 370/225 |
| 2010/0195661 A1 | 8/2010 | Thottakkara | |
| 2011/0134793 A1 | 6/2011 | Elsen et al. | |
| 2011/0292833 A1 | 12/2011 | Kapitany et al. | |
| 2012/0027017 A1 | 2/2012 | Rai et al. | |
| 2012/0106321 A1* | 5/2012 | Alon et al. | 370/221 |
| 2012/0113871 A1 | 5/2012 | Bulusu | |

OTHER PUBLICATIONS

Bottorff, "MEF Technical Activities," PPT PowerPoint presentation, Metro Ethernet Forum, IEEE, Mar. 12, 2003, 33 pp.
Bottorff et al., "Carrier Scale Ethernet: Scaling Provider Ethernet," IEEE Communications Magazine, Sep. 2008, pp. 104-109.
IEEE P802.1ah-2008, "Standard for Local and Metropolitan Area Networks—Virtual Bridged Local Area Networks—Amendment 6: Provider Backbone Bridges," Institute of Electrical and Electronics Engineers, Inc., Mar. 26, 2008, 116 pp.
"Metro Ethernet," Wikipedia, last updated Sep. 17, 2010, 6 pp., http://en.wikipedia.org/wiki/Metro_Ethernet.
Sultan, Huawei Technologies, Inc., "PBBN in the Data Center," presented at the IEEE 802.1 Interim Meeting, Pittsburgh, PA, May 18-21, 2009, 3 pp.
U.S. Appl. No. 12/771,451, by Sanjiv Doshi, filed Apr. 30, 2010.
U.S. Appl. No. 12/901,985, by Krishna Sankaran, filed Oct. 11, 2010.
Office Action dated Sep. 13, 2012 received in U.S. Appl. No. 12/980,731.

* cited by examiner

*Primary Examiner* — Kan Yuen
(74) *Attorney, Agent, or Firm* — Shumaker & Sieffert, P.A.

(57) ABSTRACT

A network system includes a provider backbone bridged network (PBBN) and a multi-homed provider bridge network (PBN) having a plurality of L2 switches that operate as backboned edge bridges (BEBs) to bridges L2 packets between the PBN and the PBBN. A first one of the L2 switches is configured to bridge L2 packets from a first backbone VLAN (B-VLAN) to the PBN when a physical link of the multi-homed PBN is operational. The L2 switch is further configured to shunt the L2 packets from the first backbone VLAN to a second one of the L2 switches operating as a secondary BEB of the multi-homed PBN via a second B-VLAN when the physical link is non-operational.

18 Claims, 7 Drawing Sheets

AVOIDING DATA LOSS IN A MULTI-HOMED LAYER TWO BRIDGING NETWORK

This application claims the benefit of U.S. Provisional Application No. 61/318,199, filed Mar. 26, 2010, the entire contents of which are incorporated by reference herein.

TECHNICAL FIELD

The invention relates to electronic computer networks and, more specifically, to layer two (L2) computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches. The Ethernet switches forward Ethernet frames, also referred to as L2 communications or L2 packets to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables associated with each of their physical interfaces. When forwarding an individual Ethernet frame, an Ethernet switches typically broadcasts the Ethernet frame to all of its physical ports unless the Ethernet switch has learned the specific physical port through which to the destination MAC address devices is reachable. In this case, the Ethernet switch forwards a single copy of the Ethernet frame out the associated physical port.

Recently, network service providers have offered systems that provide L2 connectivity between multiple, geographically separate L2 customer networks. That is, the L2 customer networks may be interconnected by the service provider to provide L2 connectivity as if the L2 customer networks were directly connected. One mechanism by which network service providers provide L2 connectivity to their customers is by utilization of Virtual Local Area Networks (VLANs). VLANs are a generic grouping mechanism for Ethernet packets that allow logical isolation of multiple L2 networks that share the same physical Ethernet ports. In other words, a service provider may associate different VLANs with different customers so that L2 traffic and L2 state information for the networks, e.g., MAC addressing information, is logically separate for the customers. VLANs allow network switches and other infrastructure of the service provider to multiplex the L2 customer traffic over shared physical Ethernet ports. In this way, each VLAN provides a connection between devices assigned to the VLAN, and each of the VLANs may essentially be treated as an independent layer two (L2) network. A device assigned to one VLAN can communicate with other devices on that VLAN but may be unable to communicate with devices on a separate VLAN. L2 packets for different VLANs may be correctly forwarded within a network by appending a VLAN tag to the packets to designate the VLAN to which each packet belongs.

One type of large area L2 network connectivity being developed is Provider Backbone Bridging (PBB) defined in accordance with IEEE standard 802.1ah. PBB defines an architecture and bridging protocols in which a Provider Backbone Bridged Network (PBBN) provides L2 connectivity between multiple provider bridge networks (PBNs) of one or more different network service providers. Such large area L2 network connectivity is being deployed, for example, in metropolitan area networks. Each PBN provides one or more service VLANs ("S-VLANS") to service and isolate L2 traffic from customer networks. Access switched for the PBBN typically include a set of Backbone Edge Bridges (BEBs) that interconnect some or all of the S-VLANs supported by multiple PBNs. Each BEB provides interfaces that further encapsulate L2 frames for transport through the PBBN. The VLANs used to encapsulate L2 frames from the PBNs and transport the L2 traffic through the PBBN are known as backbone VLANs (B-VLANs), and the resources that support those VLANs are usually considered to be part of the PBBN. In this way, the PBBN may be referred to as a Virtual Bridged Local Area Network under the administrative control of a backbone provider. Further details of PBB can be found in Institute of Electrical and Electronics Engineers, Inc., IEEE P802.1ah-2008, "Standard for Local and Metropolitan Area Networks—Virtual Bridged Local Area Networks—Amendment 6: Provider Backbone Bridges," hereby incorporated by reference in its entirety.

SUMMARY

In general, techniques are described for reducing data loss in a multi-homed layer two (L2) bridging network. For example, the techniques may be applied in a network in which a L2 provider bridge network (PBN) is multi-homed to a provider backbone bridge network (PBBN) using multiple backbone edge bridges (BEBs). An L2 backup bridge domain is defined for the multi-homed BEBs and, upon detecting a failure event, L2 traffic from the PBBN is temporarily redirected from a primary one of the BEBs to a secondary one of the BEBs using the backup bridge domain. The traffic redirection may occur in a data plane of an access L2 switch providing the primary BEB to the PBBN to reduce any data loss of incoming L2 traffic from the PBBN while, in response to the failure event, the network transitions to use of the secondary BEB of the multi-homed PBN.

The backup bridge domain may be a preconfigured backbone VLAN (B-VLAN) that provides an L2 backup network for the redirected traffic. In one example, only the BEBs involved in the multi-homing of the PBN are configured to participate as members of the backup bridge domain. In this regard, even though the BVLAN is configured as backup bridge domain to carry PBBN traffic, the scope of the bridge domain may be less than that of original B-LAN on which the traffic was received. This operates to constrain the flooding behavior for redirected L2 traffic. That is, the backup B-VLAN provides a logically separate domain so that a reduced set of the BEBs may receive the redirected L2 traffic. The bridge domain for the B-VLAN may be defined, for example, to constrain the flooding behavior to only the access switches located with the multi-homed PBN.

The invention may provide one or more advantages. For example, the techniques may avoid or reduce any potential "black hole" effect cause by a failure event, such as a link failure, in a multi-homed L2 bridging network. In the event link failure, other far-end L2 devices within the bridging network detect the link failure and initiate flushing and re-learning of the L2 state information in the backbone. The techniques described herein may avoid or reduce data loss for L2 traffic associated with failed link during this transition period, which may be substantial, e.g., hundreds of milliseconds, due at least in part to the size and complexity of larger L2 bridging networks. During this transition period, L2 traffic associated with the failed link in the multi-home PBN may be diverted to the backup bridge domain so as to effectively bypass the failed link.

In one embodiment, an L2 switch comprises an interface to receive L2 packets from a provider backbone bridged network. The L2 packets are encapsulated with virtual local area network (VLAN) tags of a first backbone VLAN within the PBBN. A packet-forwarding engine (PFE) of the L2 switch is configured to bridge the L2 packets from the first backbone VLAN to a provider bridge network (PBN) coupled to a local customer network, wherein the PBN is multi-homed having a plurality of access switches that bridge the customer network to the PBBN via a plurality of links The PFE includes a packet-forwarding integrated circuit (IC) of the PFE comprising a control logic module and selector block configured with a value indicating a state of a first one of the links. The packet-forwarding IC is programmed to egress the L2 packets from the first backbone VLAN and forward the L2 packets to the customer network via the PBN when the selector block indicates the first one of the physical links is operational. Further, the packet-forwarding IC is programmed to forward the L2 packets from the first backbone VLAN to a second one of the access switches of the PBN via a second bridge VLAN when the selector block indicates the first one of the physical links is non-operational.

In one embodiment, a method comprises receiving a layer two (L2) packet from a first backbone virtual local area network (VLAN) of a provider backbone bridged network (PBBN) that provides connectivity between multiple provider bridge networks (PBNs), wherein the L2 packet is received by a first one of a plurality of access switch that provides bridging to the PBBN from a multi-homed one of the PBNs, each of the plurality of access switches of the multi-homed PBN being coupled to a customer network by a different one of a plurality of links. The method further comprises detecting, with the first one of the access switches, a failure of one of the plurality of links within the multi-homed PBN and, in response to the link failure, forwarding the L2 packet via a second backbone VLAN to redirect the packet from the first one of the access switches of the multi-homed PBN to a second one of the access switches. The method further comprises processing the L2 packet with the second one of the access switch to egress the L2 packet from the second backbone VLAN and forward the L2 packet to a L2 customer network via the multi-homed PBN.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
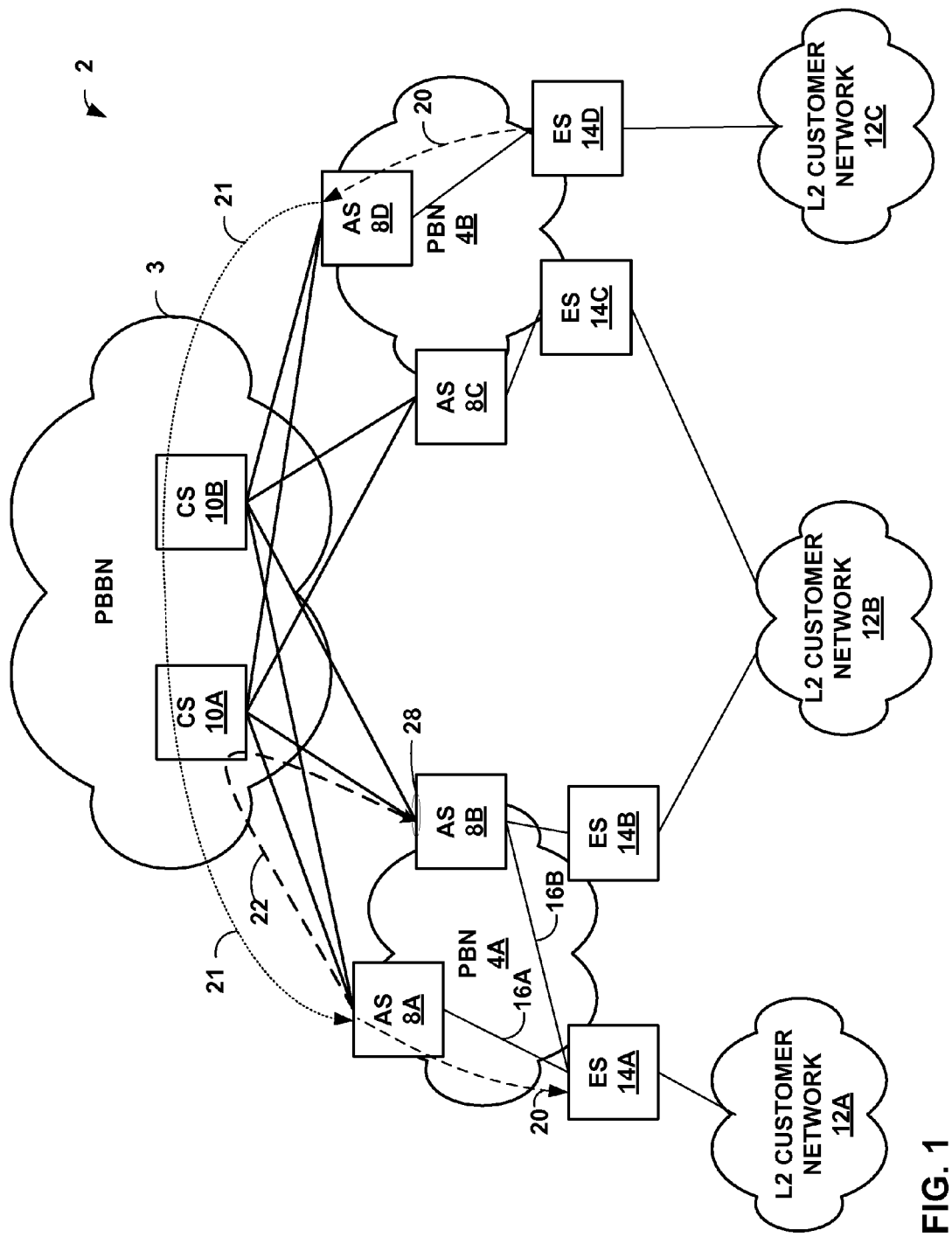
FIG. 1 is a block diagram illustrating an example network in which a Provider Backbone Bridged Network (PBBN) provides L2 connectivity between multiple provider bridge networks (PBN).

FIG. 1 is a block diagram illustrating an example network 2 in which a Provider Backbone Bridged Network (PBBN) 3 provides L2 connectivity between multiple provider bridge networks (PBN) 4A, 4B (collectively, "PBNs 4"). Each of PBNs 4 represents a components and infrastructure of a service provider that provides bridged local area network services to L2 customer networks. Each PBN 4 provides one or more service VLANs ("S-VLANS) to service and isolate L2 traffic from L2 customer networks 12. PBNs 4 may be L2 bridging networks provided by the same network service provider or by one or more different service providers. Although shown by way of example with respect to two PBNs 4A, 4B, network 2 may include more than two PBNs. In this way, the techniques in this disclosure may be readily applied to Ethernet based services (E-Line service) or Ethernet Lan services (E-LAN service).

In the example of FIG. 1, each of PBNs 4 includes one or more access switches 6 that connect the PBN to core switches within PBBM 2. In the example of FIG. 1, access switch (AS) 8A an AS 8B provide L2 connectivity to core switches (CS) 10A, 10B. Similarly, AS 8C and AS 8D provide L2 connectivity to CS 10A and CS 10B. PBBN 3 is composed of a set of Backbone Edge Bridges (BEBs) provided by backbone-facing components of access switches 8. That is, each of AS 8A-AS 8D provides a BEB for bridging to the backbone domain of PBBN 3. Each BEB provides interfaces that encapsulate (or verifies the encapsulation of) customer frames, thus allowing customer MAC (C-MAC) addresses and VLANs to be independent of the backbone MAC (B-MAC) addresses and VLANs administered by the PBBN operator.

In this way, each of PBNs 4 provide L2 bridging connectivity for one or more of L2 customer networks 12A, 12B and 12C. In this example, L2 customer network 12A is coupled to PBN 4A by an edge switch (ES) 14A. L2 customer network 12B is coupled to PBNs 4A, 4B by ES 14B and ES 14C. L2 customer network 12C is coupled to PBN 4B by ES 14D.

L2 switches within the backbone domain provided by PBBN 3, such as core switches (CS 10A and CS 10B), typically learn and maintain L2 state information (e.g., media access control (MAC) addresses and respective physical ports by which the MAC addresses are reachable) for devices within the PBBN. Conversely, edge switches (e.g., ES 14A through ES 14D) may learn and maintain L2 state information including MAC addresses for devices within a customer domain including the devices within PBNs 4 and L2 customer networks 12. Access switches (e.g., AS 8A through AS 8D) may learn and maintain L2 state information including MAC addresses and corresponding ports for devices in both the customer domain and the backbone domain to provide bridging services as BEBs. In this way, network 2 provides a large-scale, carrier-class L2 network based on a hierarchy of L2 bridges. In one example, network 2 is a metropolitan access network that covers a metropolitan area and is based on Ethernet communications. Network 2 may be used to connect individual subscribers, businesses, or even large-scale data centers to a larger service network or the Internet. In one example, network 2 conforms to the standards set forth in IEEE 802.1ah.

In operation, L2 network communications (e.g., Ethernet frames) flow between PBNs 4 via PBBN 3. To avoid loops in the L2 network, both on the PBN side and the PBBN side, access switches 8, core switches 10 and edge switches may run one or more protocols, such as the spanning tree protocol (STP). Customer traffic originating from L2 customer networks 12 typically arrive at edge switches 14 in association with a customer VLAN. That is, L2 communications (e.g., Ethernet frames) from L2 customer networks 12 typically carry customer VLAN tags and customer VLAN identifiers in addition to source and destination media access control (MAC) addresses for devices within the L2 customer networks. Edge switches 14 receive the L2 communications from L2 customer networks 12 and associate the communications with a service VLAN (S-VLAN) defined within the PBN. Each S-VLAN has a corresponding identifier (S-VID) and edge switches 14 tag each L2 frame with an S-VLAN tag associated with the corresponding PBN 4 with which the L2 frame was received.

Traffic flowing from one PBN 4 through PBBN 3 to a different PBN 4 is carried by the service VLAN and is further encapsulated within a backbone VLAN and ISID as part of the bridging service provided by the BEBs. That is, L2 frames flowing through PBBN 3 further carry backbone VLAN tags and backbone VLAN identifiers, along with an ITAG and ISID that uniquely identifies the customer, in addition to source and destination MAC addresses for core switches 10 within PBBN 3. As operational BEBs, AS 8A through AS 8D provide a mapping between the VLAN and MAC address space of PBNs 4 and PBBN 3.

As shown in the example of FIG. 1, PBN 4A is configured to provide edge switch 14A and L2 customer network 12A with redundant connectivity to the PBBN 3 via links 16A and 16B through access switches 8A and 8B. In this configuration, network 2 may be viewed as having PBN 4A multi-homed to two PBBN BEBs provided by access switches 8A and 8B. That is, either AS 8A or AS 8B can provide bridging services as a BEB for traffic flowing between PBN 4A and PBBN 3. One of access switches 8A, 8B may be chosen as a "designated forwarder" (DF) to send L2 traffic for a set of customer VLANs to and from the PBBN. In other examples, L2 traffic may flow through both of redundant links 16A, 16B for different customer VLANs to provide increased utilization of the links.

In the example of FIG. 1, switches 8, 10, 14 execute logic or software protocols, e.g., Connectivity Fault Management (CFM) protocols, that provide fault isolation and detection over large Layer 2 networks which may span several service provider networks. CFM is used to monitor, isolate and verify the faults in network 2 that result in connectivity loss between any of switches 8, 10, 14 over one or more links. In the event of a failure affecting a multi-homed configuration, such as failure of either of link 16A, CFM protocols executing in, for example, a control plane of each of switches 8, 10, 14 may cause one or more the switches to detect the failure and logically reassign the S-VLANS to the alternate path, i.e., link 16B in this case.

For example, L2 traffic may flow from ES 14D to ES 14A over a first SVLAN 20 bridged to flow through backbone VLAN (B-VLAN) 21. L2 traffic of SVLAN 20 flows through PBBN 3 from AS 8D to AS 8A via B-VLAN 21 in which the L2 traffic is further encapsulated and decapsulated via AS 8A and 8AD operating as BEBs. In steady state operation, CS 10A, CS 10B, AS 8A and AS 8D each maintain MAC state information for B-VLAN 21, including state information indicating which physical interface the MAC address for AS 8A is reachable. In the event link 16A fails, CFM protocols in the control plane of switches 8 and 10 detect the link failure and initiate flushing of the L2 state information related to B-VLAN 21, thereby causing the switches to start flooding L2 traffic associated with the B-VLAN until reachability information for the MAC address of AS 8A can be relearned.

Due at least in part to the size and complexity of the large L2 bridging network, this transition period from usage of link 16A to link 16B for SVLAN 20 and B-VLAN 21 using control-plane CFM protocols may be significant, e.g., on the order of hundreds of milliseconds. Outbound L2 traffic received from L2 customer network 12A may be immediately directed to link 16B via ES 14A, which is directly coupled to link 16A and, therefore, may directly detect the failure of the like. However, during the transition period, inbound L2 traffic carried by B-VLAN 21 from PBBN 3 to PBN 4A may continue to arrive at the first BEB, i.e., AS 8A, from CS 10A. In order to reduce loss of this inbound data during the period while switches within the bridge domain learn of the failure and transition to usage of link 16B, PBN 4A utilizes a backup bridge domain to shunt traffic. That is, the backup bridge domain has been pre-configured as a failover to temporarily carry traffic for B-VLAN 21 between the multi-homed BEBs (AS 8A and AS 8B) in the event connectivity fails for the multi-homed PBN 4A. In one example, the backup bridge domain may be a pre-configured failover B-VLAN 22 within the bridge domain of PBBN 3. For example, each of AS 8A and AS 8B may be pre-configured to install forwarding information for B-VLAN 22 into forwarding hardware within a data plane of each of the switches. The preconfigured backbone B-VLAN provides a backup bridge domain as an L2 backup virtual network for the redirected traffic. In one embodiment, only the BEBs involved in the multi-homing of PBN 4A are configured to participate as members of the backup bridge domain. In this regard, even though BVLAN 22 is configured as backup bridge domain to carry PBBN traffic, the scope of the bridge domain may be less than that of original B-VLAN 21. This operates to constrain the flooding behavior for L2 traffic redirected from one bridge domain of B-VLAN 21 to a different bridge domain of B-VLAN 22. Thus, B-VLAN 22 provides a logically separate domain so that a reduced set of the BEBs may receive the redirected L2 traffic. The bridge domain for B-VLAN 22 may be defined, for example, to constrain the flooding behavior to only the access switches located with the multi-homed PBN, i.e., AS 8A and AS 8B in this example. Thus, rather than flooding the redirected L2 PBBN traffic to all of the PBNs participating in the domain of B-VLAN 21, the L2 traffic may be contained within PBN 4A.

For example, upon failure of link 16A, the forwarding hardware of AS 8A detects the link failure and automatically diverts traffic incoming from B-VLAN 21 with AS 8A destination MAC address to B-VLAN 22. At this time AS 8A may transparently modify information within a backbone-level header of each L2 frame carried by SVLAN 20 so that the traffic conforms to the new flooding domain of the backup bridge domain. For example, as further explained below, AS 8A may transparently modify a backbone VLAN identifier (B-VID) in an outer header of the redirected L2 traffic. In addition, AS 8A may be provisioned to modify a backbone domain destination MAC address from a MAC address of AS 8A to a multicast MAC address. In this way, the L2 traffic may be modified to conform to multicast traffic that is flooded to the BEBs that are provisioned to participate in the constrained flooding domain associated with B-VLAN 22. AS 8A also modifies a backbone domain source MAC address from AS 8D to AS 8A. In some embodiments, the redirected traffic may be unicasted to a specific AS in the PBN. This may, however, require extra provisioning, especially in the event AS 8A supports multiple customers.

Upon receipt of the modified L2 traffic for B-VLAN 21 via B-VLAN 22, the pre-configured data plane of AS 8B directs the L2 traffic to ES 14A via link 18B.

Figure 4:
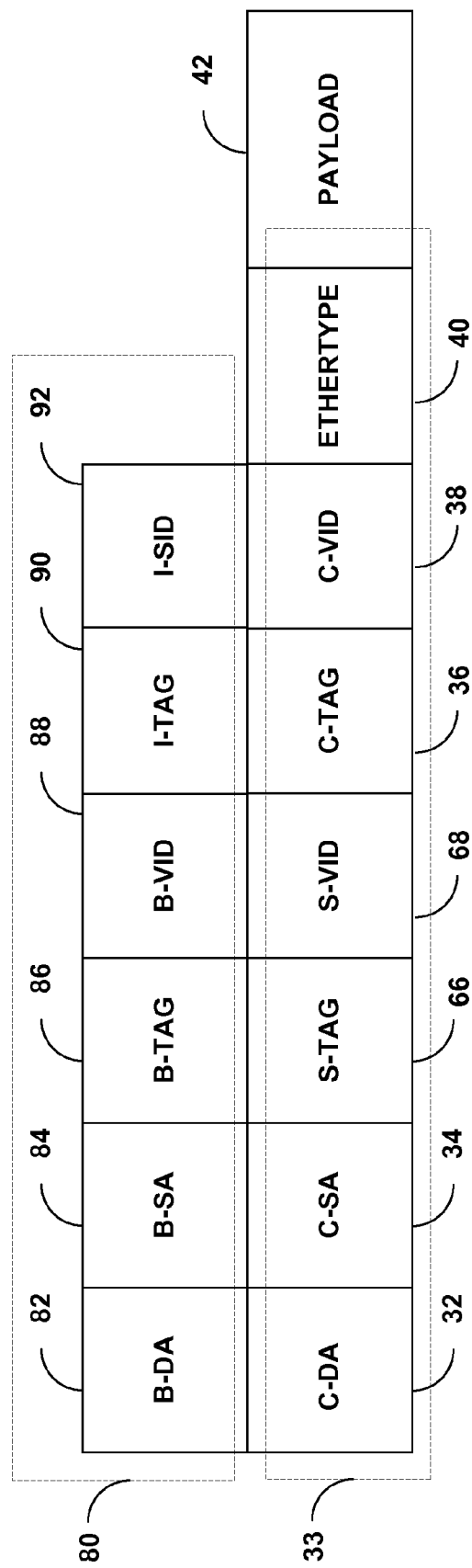
FIG. 4 is a block diagram illustrating an example format of L2 data frames traversing a PBBN.

The backup bridge domain may be pre-configured within L2 access switches 8A, 8B on the PBBN side of the bridging architecture. Alternatively, a provider of the multi-homed PBN 4A can provision the backup bridge domain on the PBN side of the bridging architecture within access switches 8A, 8B. In either case, the redirected L2 remains encapsulated as PBBN traffic (as shown in FIG. 4 below), but is modified for L2 forwarding within the backup network domain. If configured on the PBBN side, the backup bridge domain utilize a B-VLAN within the logical VLAN space of the PBBN. If configured on the PBN side of access switches 8A, 8B, the operator may configure a separate routing instance and identify the new routing instance as providing the backup bridge domain. In this case, the backup domain may be viewed as a dedicated S-VLAN on the PBN side of the bridging architecture, where the S-VLAN carries PBBN encapsulated traffic. Thus, regardless of whether the backup domain is configured on the PBBN side or the PBN side of the bridging architecture of access switch 8A, 8B, a VLAN is used from the VLAN space to define a new flood domain that is constrained to PBN 4A. This may, for example, help avoid using bandwidth in the PBBN as the redirected L2 traffic can be constrained the multi-homed PBN.

In this way, L2 traffic carried by SVLAN 20 is directed away from failed link 16A avoiding or reducing any potential "black hole" effect caused by the link failure. The automated switchover to B-VLAN 22 in the data planes of AS 8A and AS 8B may be on the order of ten milliseconds or less, for example, and may avoidance of significant traffic loss and connectivity disruption. Although the backup bridge domain is described by way of example to a pre-configured B-VLAN, a provider of the multi-homed PBN can use infrastructure of the PBN (i.e., an SVLAN) or a private network to enable the backup bridge domain, thereby potentially avoiding the use of additional B-VLANs. Additionally, the provider can share this backup B-VLAN across all SVLANs.

Figure 2:
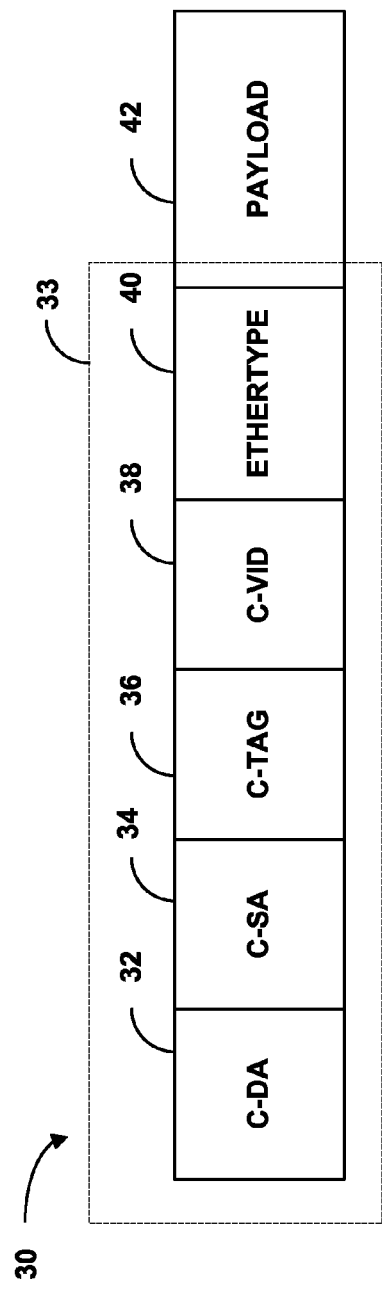
FIG. 2 is a block diagram illustrating an example format of L2 data frames received from L2 networks.

FIG. 2 is a block diagram illustrating an example format of L2 data frames received from L2 customer networks 12. In this example, Ethernet frame 30 includes an L2 header 33 and a payload 42. L2 header includes a customer device destination MAC address (C-DA) 32, a customer device source MAC address (C-SA) 34, a customer VLAN (CVLAN) tag (C-tag) 36, a customer VLAN identifier (C-VID) 38, and header information 40 indicating the L2 frame is of type Ethernet ("Ethertype"). L2 header 33 of Ethernet frame 30 may include additional fields not shown for purposes of simplicity.

Figure 3:
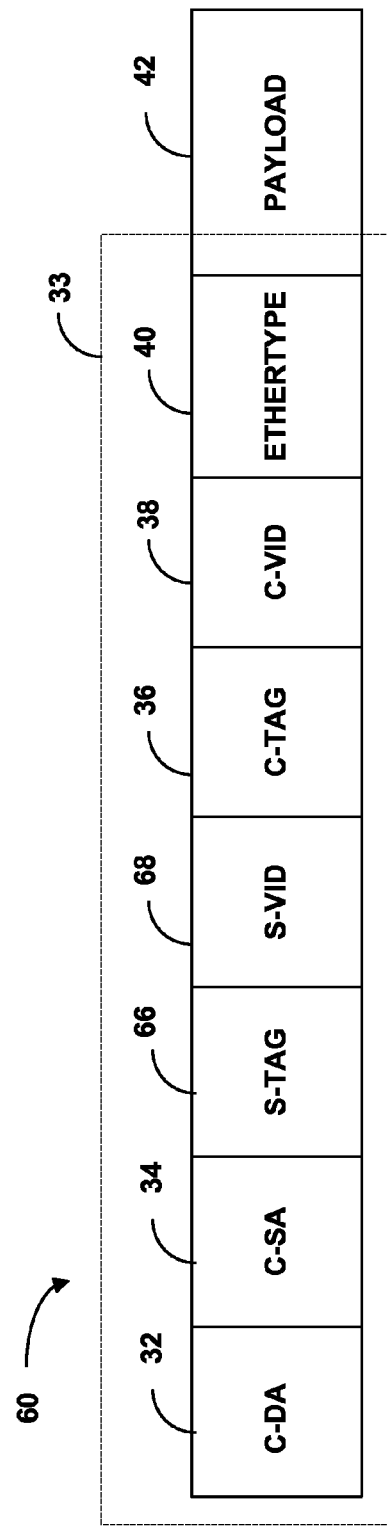
FIG. 3 is a block diagram illustrating an example format of L2 data frames traversing PBNs.

FIG. 3 is a block diagram illustrating an example format of L2 data frames traversing PBNs 4, such as L2 traffic forwarded from ES 14A to AS 8A. In this example, ES 14A has generated Ethernet frame 60 by associating original Ethernet frame 30 of FIG. 2 with a service VLAN (SVLAN) and reforming L2 header 33 to include a service VLAN tag (S-tag) 66 and a service VLAN identifier (S-VID) 68.

FIG. 4 is a block diagram illustrating an example format of L2 data frames traversing PBBN 3, such as L2 traffic bridged from AS 8D to AS 8A to the PBBN for forwarding over B-VLANs via CS 10A or CS 10B. In this example, operating as a BEB, AS 14A has generated Ethernet frame 80 by associating Ethernet frame 60 with a backbone VLAN (B-VLAN) and then encapsulating Ethernet frame 60 with an additional L2 header 80. In this example, L2 header 80 includes a bridge device destination MAC address (B-DA) 82, a bridge device source MAC address (B-SA) 84, a backbone VLAN (B-VLAN) tag (B-Tag) 86, a backbone VLAN identifier (B-VID) 88 and I-TAG 90 and I-SID 92 that uniquely identify the customer associated with the traffic as the traffic is carried throughout PBBN 3 by one or more backbone VLANs. In this way, the BEB, such as AS 8A, provides a mapping to bridge VLAN and MAC address information between a PBN and the PBBN.

Figure 5:
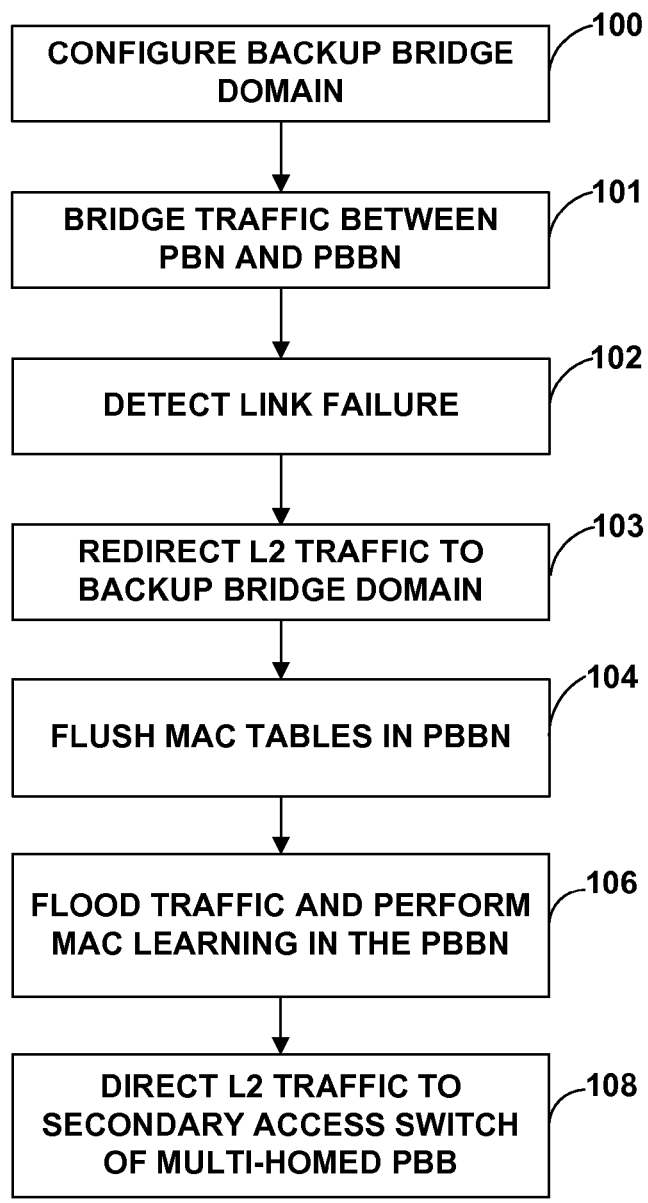
FIG. 5 is a flowchart illustrating example operation of components of the example network of FIG. 1.

FIG. 5 is a flowchart illustrating an example operation of network 2 of FIG. 1. Initially a user, such as an administrator for a service provider of PBBN 3, configures AS 8A and AS 8B to install a backup bridge domain for temporarily carrying L2 traffic during transition between multi-homed links 16 (102). The backup bridge domain may be a B-VLAN, such as B-VLAN 22 in the backbone domain of PBBN 3, or it may use the infrastructure of the multi-homed PBN or a private network. In any case, the administrator may interact with AS 8A and AS 8B directly, or via a remote management system, to define a unique B-VLAN tag, a backbone VLAN identifier and other information necessary for specifying the B-VLAN. In response, configuration software executing in the control planes of AS 8A and AS 8B installs B-VLAN 22 in respective forwarding hardware of the switches and associates the installed B-VLAN with forwarding state for the BEBs within the hardware. Moreover, the configuration software may configure the forwarding hardware to constrain L2 learning to facilitate forwarding of L2 frames during the transition.

As one example, the configuration software may configure the forwarding hardware such that, upon failure, the forwarding hardware modifies the outer L2 header of each L2 frame received from B-VLAN 21 when redirecting the L2 frame to B-VLAN 22. For example, with respect to FIG. 4, the configuration software may program the forwarding hardware to, upon detection of failure of link 16A, modify B-VID 88 of L2 header 80 from the B-VID for B-VLAN 21 to the B-VID of B-VLAN 22 as configured by the operator. Further, the configuration software may program the forwarding hardware to, upon detection of the failure, modify B-DA 82 of the L2 header 80 with only MAC of AS 8A to a default multicast MAC address for that ISID or to a multicast MAC address configured for that ISID for the backup bride domain. In addition, the forwarding hardware modifies B-SA 84 from the MAC address of AS 8D to AS 8A. In this way, the forwarding hardware is configured such that, upon failure of link 8A, AS 8A will immediately shunt any inbound L2 traffic with B-DA 82 of AS 8A of B-VLAN 21 to B-VLAN 22 and modify the outer L2 header so that the L2 traffic appears to be legitimate L2 traffic sourced by AS 8A as a BEB into the backbone domain provided by PBBN 3. The shunted L2 traffic may be carried by a physical link between AS 8A and AS 8B without physically leaving multi-homed PBN 4A.

In addition, the forwarding hardware of AS 8A or 8B may be configured to operate in accordance with altered rules for learning of L2 state information with respect to the backup bridge domain, e.g., B-VLAN 22. For example, as explained above, access L2 switches (e.g., AS 8A through AS 8D) that provide PBBN backbone edge bridges may learn and maintain L2 state information, such as MAC addresses and corresponding ports through which the addresses are reachable, for devices in both the customer domain and the backbone domain. However, the forwarding hardware of AS 8B may be configured to prevent learning of customer MAC addresses with respect to the shunted L2 traffic traversing the backup bridge domain, e.g., B-VLAN 22 in this example. For example, prior to failure of link 16A, AS 8B may have learned MAC addresses of devices within L2 customer network 12C as reachable via interface 28. Configuring AS 8A to constrain MAC learning with respect to B-VLAN 22 may prevent AS 8B from temporarily and improperly re-associating (referred to as "moving") those customer MAC addresses during the transition as reachable through the inbound physical interface by which the shunted L2 traffic from B-VLAN 22 is received.

Once configured, AS 8A and AS 8B operate as BEBs to bridge traffic between PBN 4A and PBBN 3 (101). For example, AS 8D receives L2 traffic associated with SVLAN 20 via link 16A, encapsulates the traffic and provides ingress for the L2 traffic into PBBN 3 via B-VLAN 21. Upon AS 8A detecting failure of link 16A (102), the forwarding hardware redirects any L2 traffic received via B-VLAN 21 within the bridge domain to the backup bridge domain, e.g., B-VLAN 22 in this example. Moreover, the forwarding hardware may modify the outer L2 header of each L2 frame received from B-VLAN 21 as described above prior to outputting the L2 frame on B-VLAN 22. Detection of the failure of link 16A may occur within the data plane of the AS 8A, such as via a signal or other communication between an interface card physically coupled to link 16A and the forwarding hardware of AS 8A. Alternatively, CFM protocols or other software on AS 8A may detect the failure of the link and direct the forwarding engine to redirect inbound traffic from B-VLAN 21 to pre-configured B-VLAN 22. In any case, detection and initiation of redirection of L2 traffic may occur quickly, e.g., on the order of a few milliseconds. Consequently, L2 traffic received from B-VLAN 21 after the detection of the failure of link 16A need not be dropped by AS 8A while CFM protocols of devices within PBBN 3 learn of the failure and transition to usage of the secondary BEB of PBN 4A provided by AS 8B.

For example, in response to the detected failure of link 16A, CFM protocols in the control planes of switches 8, 10 may initiate flushing of the L2 state information related to B-VLAN 21, including the backbone MAC addresses associated with the B-VLAN (104). This process alone may take tens or hundreds of milliseconds depending upon the size and complexity of PBBN 3. Once detected in the control plane of the various switches 8, 10 throughout PBBN, the switches start flooding L2 traffic associated with the B-VLAN until reachability information for the MAC address can be relearned (106).

As one example, CFM protocols executing on AS 8D may learn of the failure of link 16A by communicating with CFM protocols executing on AS 8A. As a result, AS 8D flushes MAC tables associated with B-VLANS associated with PBN 4A, including MAC tables associated with B-VLAN 21. As a result, AS 8D receives customer traffic from ES 14D via SVLAN 20, encapsulates the traffic for B-VLAN 21 and floods the traffic into PBBN, which is received by AS 8A and AS 8B. AS 8A does not forward this traffic to backbone BVLAN 22 since B-DA 82 of this traffic is not set to the MAC address of AS 8A. In this way, traffic is only temporarily forwarded over backup B-VLAN 22. This process continues until AS 8D re-learns the physical interfaces through which the backbone destination MAC addresses of AS 8D is reachable for bridging the traffic of B-VLAN 21 to EA 14A via link 16B of PBN 4A. Upon convergence, L2 traffic for SVLAN 20 flows from AS 8D to AS 8B via B-VLAN 21 and ultimately to L2 customer network 12A via link 16B and ES 14A (108).

Figure 6:
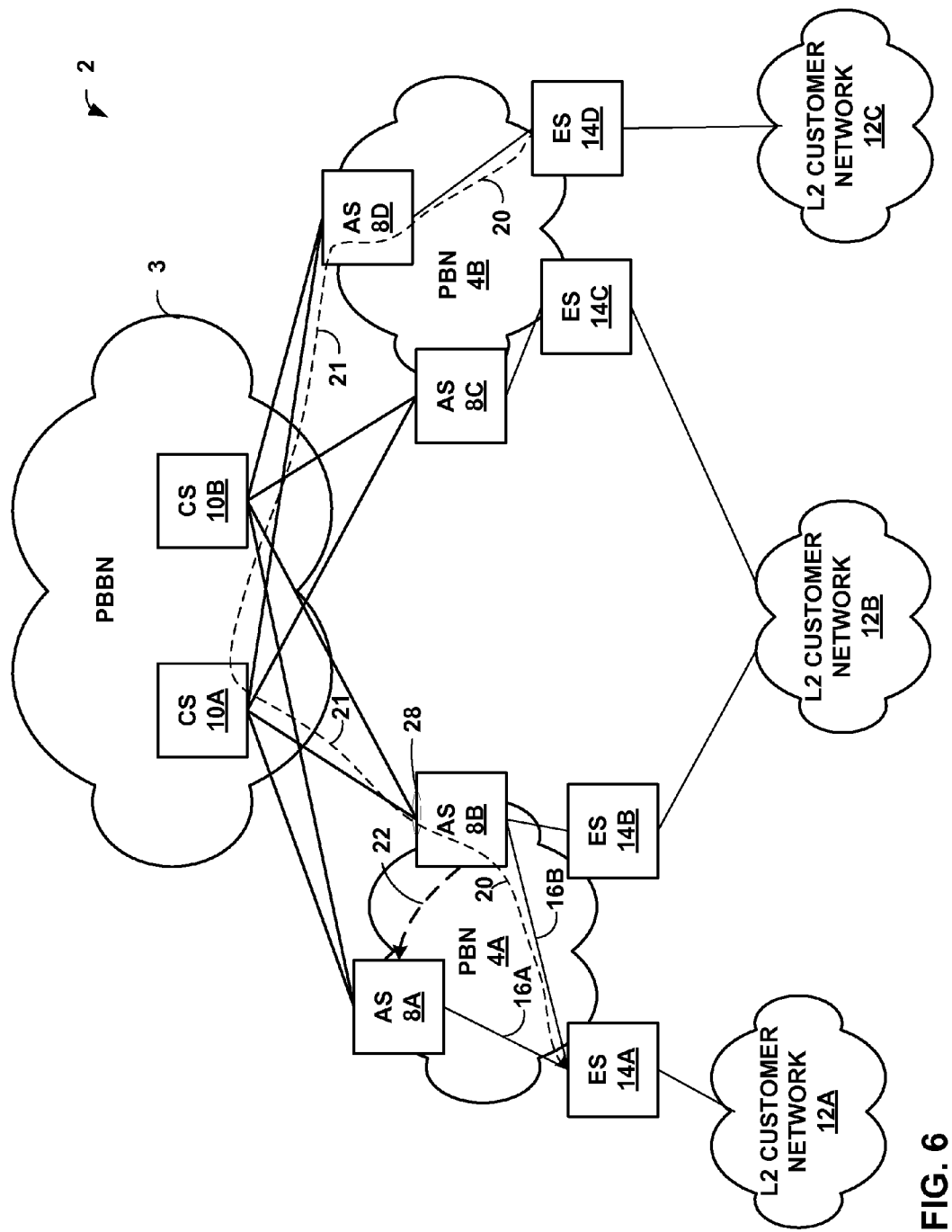
FIG. 6 is a block diagram illustrating an example operation state of network of FIG. 1 after completion of a failover event.

FIG. 6 shows operational state of network 2 after failover and completion of the transition to the secondary BEB provided by AS 8B such that traffic for B-VLAN 21 flows through AS 8B and link 16B. At this point, little or no traffic for B-VLAN 21 flows through the backup bridge domain, e.g., B-VLAN 22, as traffic from PBBN 3 flows directly to the secondary BEB (i.e., AS 8B in this example). If link 16A becomes operational, AS 8A and AS 8B may reconfigure B-VLAN 22 for temporarily shunting traffic back to the BEB provided by AS 8A in the event link 16B should fail.

Figure 7:
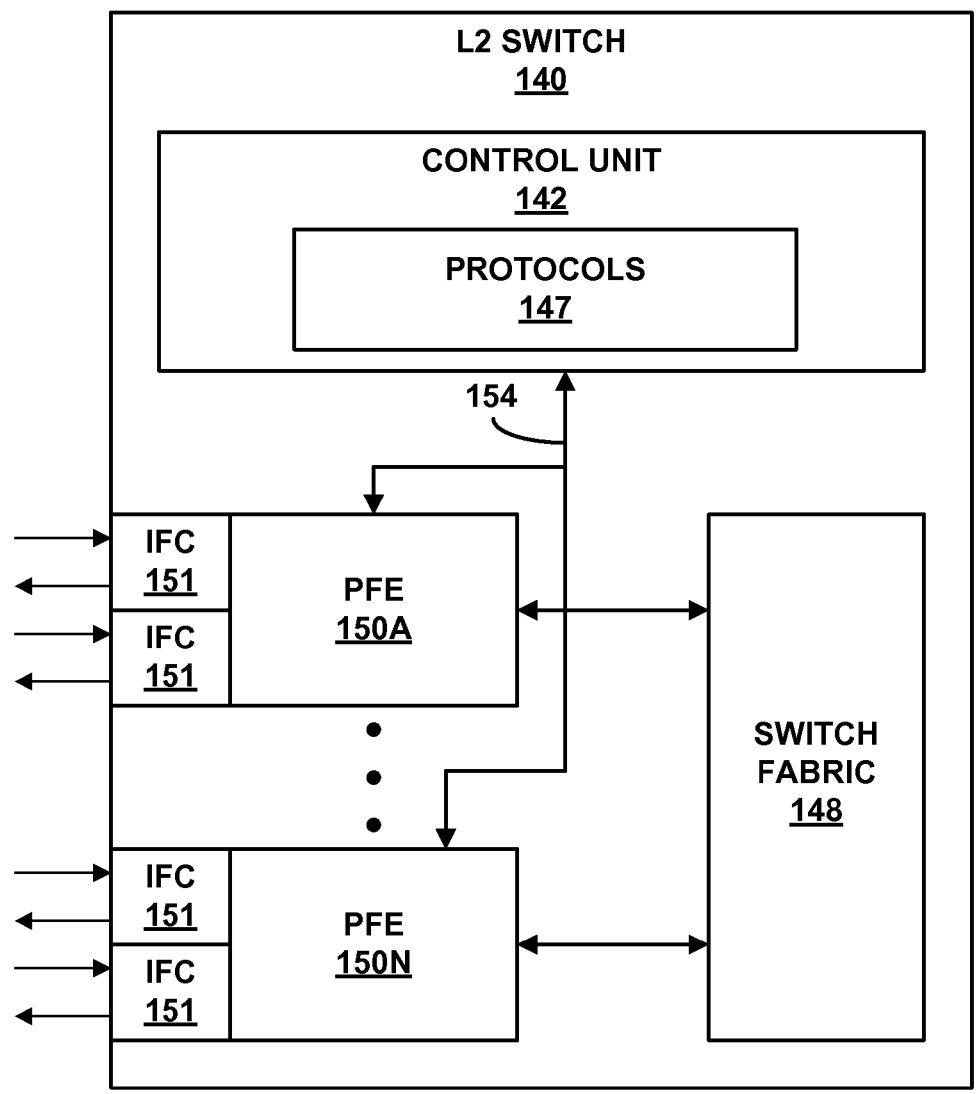
FIG. 7 is a block diagram illustrating an example L2 switch capable of operating as a backbone edge bridge (BEB).

FIG. 7 is a block diagram illustrating an example L2 switch 140, such as access switch 8A of PBBN 3. In this example, L2 switch 140 includes a control unit 142 that provides control plane functionality for the L2 switch. L2 switch 140 also includes a plurality of packet-forwarding engines 150A-150N ("PFEs 150") and a switch fabric 148 that collectively provide a data plane for forwarding network traffic, such as the L2 frames and VLAN traffic described herein.

PFEs 150 receive and send data packets via interface cards 151 ("IFCs 151"). In other embodiments, each of PFEs 150 may comprise more or fewer IFCs. Although not shown, PFEs 150 may each comprise a central processing unit (CPU), memory and supporting hardware. Switch fabric 148 provides a high-speed interconnect for forwarding incoming data packets to the correct one of PFEs 150 for transmission over a network.

Control unit 142 provides control plane functions for L2 switch 140. For example, control unit 142 provides an environment for storing L2 network topology information, e.g., spanning tree information, executing CFM protocols to provide fault isolation and detection over large L2 networks, and providing a management interface to allow user access and configuration of L2 switch 140. The operating environment of control unit 142 may be implemented solely in software, or hardware, or may be implemented as a combination of software, hardware or firmware. For example, control unit 142 may include one or more processors which execute software instructions. In that case, control unit 142 may include various software modules or daemons, and may include a computer-readable storage medium, such as computer memory or hard disk, for storing executable instructions.

In this example, control unit 142 is connected to each of PFEs 150 by a dedicated internal communication link 154. For example, dedicated link 154 may comprise a 200 Mbps Ethernet connection. Control unit 142 may maintain a forwarding information base (FIB) (not shown) that represents a logical topology of the L2 network, e.g., a spanning tree. In addition, the FIB may include information specifying VLANS, including VLAN tags and identifiers, such as the S-VLANS and B-VLANS described herein. In one embodiment, control unit 142 communicates data representative of a software copy of the FIB into each of PFEs 150 to program the PFEs and thereby control forwarding of traffic within the data plane. This allows the software FIB stored in memory (e.g., on-chip RAM) of in each of PFEs 150 to be updated without degrading packet-forwarding performance of L2 switch 140. In some instances, control unit 142 may derive separate and different software FIBs for each respective PFEs 150. In addition, one or more of PFEs 150 include application-specific integrated circuits (ASICs) (not shown) that PFES 150 programs with a hardware-copy of the FIB based on the software FIBs (i.e., hardware versions of the software FIBs) copied to each respective PFE 30.

As described herein, the hardware FIBs within the forwarding ASICs are dynamically programmed by control logic on PFEs 150 to include entries that define a backup bridge domain for shunting traffic through to a different access switch while the PBBN transitions in response to a link failure within a multi-homed PBN. In addition, the control logic within each PFE 30 may program the hardware FIB so as to associate VLAN entries (e.g., an entry for B-VLAN 21) with one of a plurality of selector blocks within the ASIC, where each selector block includes circuitry configured to reflect the state of the physical link and/or interface port to which the primary next hop for the entry is assigned. If the link should fail, the PFE coupled to the IFC 151 servicing the failed link reprograms the selector block of the ASIC (e.g., by rewriting a value within addressable memory in the selector block) to reflect the failure, and the L2 traffic is automatically redirected to the appropriate shunt B-VLAN (e.g., B-VLAN 22) using the appropriate L2 label for the backup bridge domain. In this way, the techniques avoid any requirement that PFEs 150 and/or control unit 142 must having to individually rewrite VLAN entries in the hardware FIB and/or regenerate the FIB at all.

Figure 8:
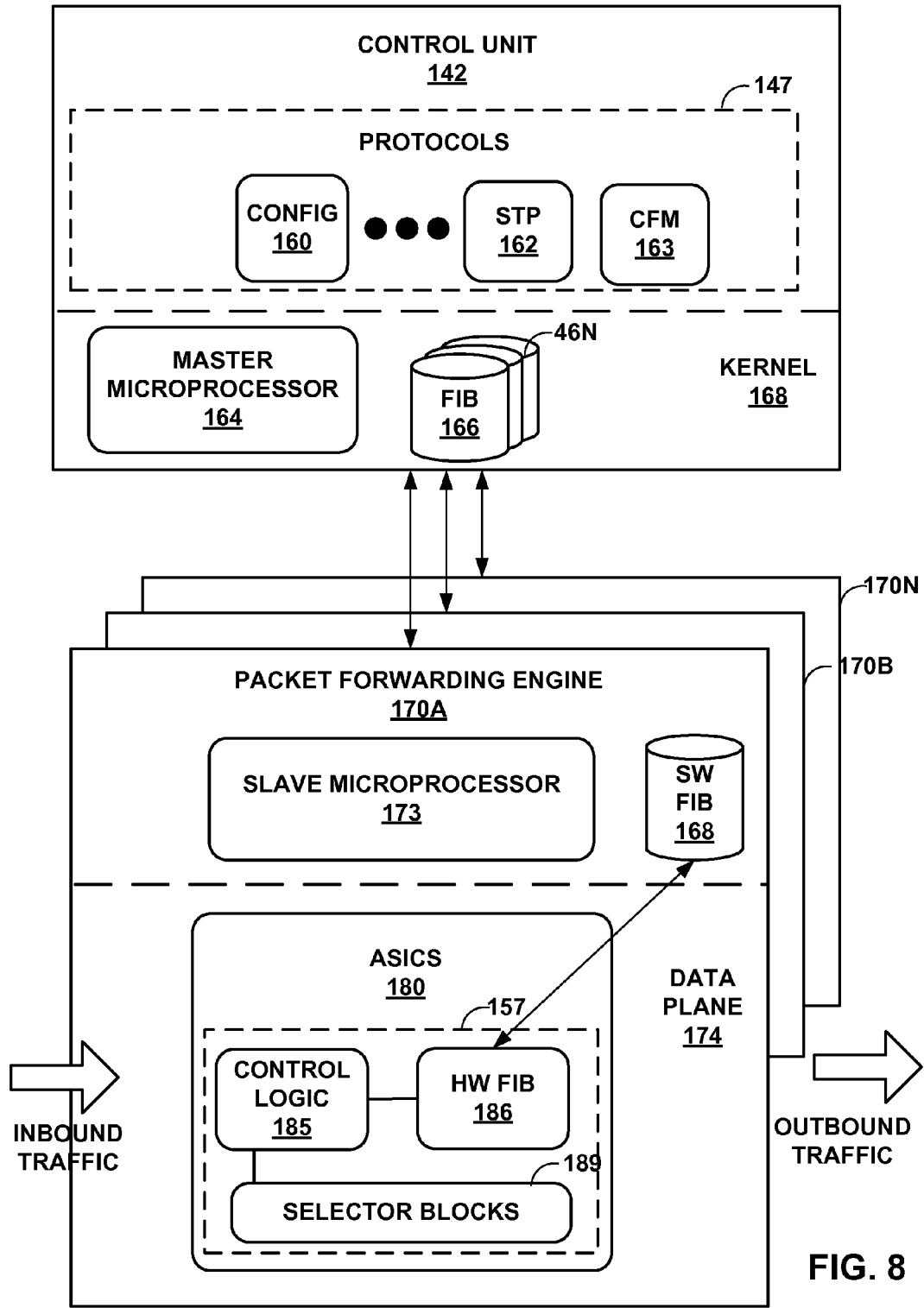
FIG. 8 is a block diagram illustrating an example embodiment of the L2 switch of FIG. 2 in further detail.

FIG. 8 is a block diagram illustrating an example embodiment of the L2 switch 140 of FIG. 2 in further detail. In this example, control unit 142 provides a "control plane" operating environment for execution of various software protocols 147, such a configuration protocol or management interface 160, a spanning tree protocol 162, and one or more CFM protocols 163. Control unit 142 may include other protocols and additional software processes not shown in FIG. 9. Protocols 147 execute on and interact with kernel 167 (e.g., by way of API calls). Master microprocessor 164 executing kernel 167 generates forwarding information in the form of FIBs 166A-166N based on commands and instructions received from protocols 147, which may include entries for various VLANS and other L2 information. Master microprocessor 52 of kernel 167 then programs PFEs 150 to install copies of the FIBs as software FIBs 168.

In this example, ASICs 180 are microcode-controlled chipsets programmably configured by a slave microprocessor 173 executing on each of PFEs 150 (e.g., PFE 30A). That is, one or more of ASICs 180 may be controllable by microcode 157 programmed by slave microprocessor 173. Slave microprocessor 173 programs a hardware FIB 186 into internal memory of ASICs 180 within the data plane 174 based on software FIB 168, thereby configuring forwarding ASICs 180. Control logic 185 updates HW FIB 186 when forwarding L2 traffic to maintain and update L2 state information, including MAC addresses and respective physical ports of IFCs 151 by which the MAC addresses are reachable.

When forwarding an L2 packet, control logic 185 accesses HW FIB 185 (e.g., based upon the VLAN tags within the header of the L2 packet) and, upon selecting a FIB entry for the L2 packet, microcode-implemented control logic 185 automatically selects a forwarding interface for the L2 packet or, in some cases, selects multiple forwarding interfaces to flood or broadcast the L2 packet based on the current L2 state information for the L2 network. In some cases, the selection of the forwarding interfaces is based on a value output by one of selector blocks 59 associated with the entry (e.g., the value may be represented by a signal), which represents a status of a particular link. Slave microprocessor 173 monitors the status of links associated with L2 switch 140, and programs the selector blocks 189 (e.g., by setting of a bit map) to reflect any change in the status of a physical link without first receiving instructions from any of protocols 147 executing on master microprocessor 164.

After the ASICs 180 are programmed, data plane 174 of L2 switch 140 receives inbound L2 traffic, such as Ethernet frames encapsulated within a B-VLAN of a PBBN. Based on HW FIB 186 and the state of the corresponding selector block, ASICs 180 will automatically forward the packet out the appropriate interface port. When redirecting the L2 traffic based on the state of a failed link as indicated by selector blocks 189, control logic 185 may automatically modify the outer L2 header of each L2 frame in accordance with the shunt B-VLAN. Moreover, control logic 185 may constrain the updating of L2 state information HW FIB 186 as described herein with respect to the redirected L2 traffic.

Various embodiments of the invention have been described. These and other embodiments are within the scope of the following claims.

The invention claimed is:

1. A method comprising:
    receiving a layer two (L2) packet from a first backbone virtual local area network (VLAN) of a provider backbone bridged network (PBBN) that provides connectivity between multiple provider bridge networks (PBNs), wherein the L2 packet is received by a first one of a plurality of access switches that provide bridging to the PBBN from a multi-homed one of the PBNs, each of the plurality of access switches of the multi-homed PBN being coupled to a customer network by a different one of a plurality of links;
    detecting, with the first one of the access switches, a failure of one of the plurality of links within the multi-homed PBN;
    in response to the link failure, forwarding the L2 packet via a second backbone VLAN to redirect the L2 packet from the first one of the access switches of the multi-homed PBN to a second one of the access switches;
    constraining L2 learning of the first switch to prevent updating MAC tables based on a MAC address of the redirected L2 packet when forwarding the L2 packet via the second backbone VLAN; and
    processing the L2 packet with the second one of the access switches to egress the L2 packet from the second backbone VLAN and forward the L2 packet to a L2 customer network via the multi-homed PBN.

2. The method of claim 1, further comprising pre-configuring the second backbone VLAN as a failover backbone VLAN to temporarily carry traffic for the first backbone VLAN in response to detection of the failed link.

3. The method of claim 1, wherein forwarding the L2 packet comprises modifying a header of the L2 packet with forwarding hardware of the first access switch to change a backbone VLAN identifier within the header from a backbone VLAN identifier for the first backbone VLAN to a backbone VLAN identifier for the second backbone VLAN.

4. The method of claim 1, wherein forwarding the L2 packet comprises modifying a header of the L2 packet with forwarding hardware of the first access switch to change a backbone destination media access control (MAC) address from a MAC address of the first switch to a multicast MAC address.

5. The method of claim 1, forwarding the L2 packet comprises modifying a header of the L2 packet with forwarding hardware of the first access switch to change a backbone destination media access control (MAC) address from a MAC address of the first switch to a unicast MAC address of a second one of the access switches of the multi-homed PBN.

6. The method of claim 1, wherein detecting a failure of one of the plurality of links comprises detecting the failure in a data plane of the first access switch.

7. The method of claim 1, wherein the L2 packet comprises an Ethernet frame.

8. A method comprising:
    receiving a layer two (L2) packet from a first backbone virtual local area network (VLAN) of a provider backbone bridged network (PBBN) that provides connectivity between multiple provider bridge networks (PBNs), wherein the L2 packet is received by a first one of a plurality of access switches that provide bridging to the PBBN from a multi-homed one of the PBNs, each of the plurality of access switches of the multi-homed PBN being coupled to a customer network by a different one of a plurality of links:

detecting, with a data plane of the first one of the access switches, a failure of one of the plurality of links within the multi-homed PBN;

in response to the link failure, updating a selector block in forwarding hardware of the first access switch in response to the detected failure without first receiving instructions from a control protocol executing on a processor of the access switch forwarding the L2 packet via a second backbone VLAN based on the updated selector block to redirect the L2 packet from the first one of the access switches of the multi-homed PBN to a second one of the access switches; and processing the L2 packet with the second one of the access switches to egress the L2 packet from the second backbone VLAN and forward the L2 packet to a L2 customer network via the multi-homed PBN.

9. A method comprising:

receiving a layer two (L2) packet from a first backbone virtual local area network (VLAN) of a provider backbone bridged network (PBBN) that provides connectivity between multiple provider bridge networks (PBNs), wherein the L2 packet is received by a first one of a plurality of access switches that provide bridging to the PBBN from a multi-homed one of the PBNs, each of the plurality of access switches of the multi-homed PBN being coupled to a customer network by a different one of a plurality of links:

detecting, with the first one of the access switches, a failure of one of the plurality of links within the multi-homed PBN;

in response to the link failure, forwarding the L2 packet via a second backbone VLAN to redirect the L2 packet from the first one of the access switches of the multi-homed PBN to a second one of the access switches, wherein the second backbone VLAN provides a flood domain that is less than the first backbone VLAN of the PBBN and is constrained to the multi-homed PBN; and processing the L2 packet with the second one of the access switches to egress the L2 packet from the second backbone VLAN and forward the L2 packet to a L2 customer network via the multi-homed PBN.

10. A layer two (L2) switch comprising:

an interface to receive L2 packets from a provider backbone bridged network, wherein the L2 packets are encapsulated with virtual local area network (VLAN) tags of a first backbone VLAN within the PBBN;

a packet-forwarding engine (PFE) configured to bridge the L2 packets from the first backbone VLAN to a provider bridge network (PBN) coupled to a local customer network, wherein the PBN is multi-homed having a plurality of access switches that bridge the customer network to the PBBN via a plurality of links;

wherein the PFE includes a packet-forwarding integrated circuit (IC) of the PFE comprising a control logic module and selector block configured with a value indicating a state of a first one of the links, wherein the packet-forwarding IC is programmed to egress the L2 packets from the first backbone VLAN and forward the L2 packets to the customer network via the PBN when the selector block indicates the first one of the physical links is operational, and wherein the packet-forwarding IC is programmed to forward the L2 packets from the first backbone VLAN to a second one of the access switches of the PBN via a second backbone VLAN when the selector block indicates the first one of the physical links is non-operational, and wherein the packet-forwarding engine is programmed to constrain L2 learning to prevent updating MAC tables based on MAC address of the L2 packets when forwarding the L2 packets via the second backbone VLAN.

11. The L2 switch of claim 10, wherein the packet-forwarding engine stores forwarding information that pre-configures the second backbone VLAN as a failover backbone VLAN to temporarily carry traffic for the first backbone VLAN when the selector block indicates the first one of the physical links is non-operational.

12. The L2 switch of claim 10, wherein the packet-forwarding engine is programmed to modify a header of the L2 packet to change a backbone VLAN identifier from a backbone VLAN identifier for the first backbone VLAN to a backbone VLAN identifier for the second backbone VLAN when the selector block indicates the first one of the physical links is non-operational.

13. The L2 switch of claim 10, wherein the packet-forwarding engine is programmed to modify a header of the L2 packet with forwarding hardware of the first access switch to change a backbone destination media access control (MAC) address from a MAC address of the first switch to a multicast MAC address when the selector block indicates the first one of the physical links is non-operational.

14. The L2 switch of claim 10, wherein the packet-forwarding engine is programmed to modify a header of the L2 packet with forwarding hardware of the first access switch to change a backbone destination media access control (MAC) address from a MAC address of the L2 switch to a unicast MAC address of the second one of the access switch of the multi-homed PBN when the selector block indicates the first one of the physical links is non-operational.

15. The L2 switch of claim 10, further comprising:

an interface card providing the interface to the provider backbone bridged network (PBBN), a control protocol executing on a processor of the L2 switch, wherein the control protocol programs the packet-forwarding engine (PFE), and wherein the control logic of the packet-forwarding engine sets the value of the selector block in response to a signal from an interface card of the L2 switch without first receiving instructions from a control protocol executing on a processor of the L2 switch.

16. The L2 switch of claim 10, wherein the L2 packet comprises an Ethernet frame.

17. A network system comprising:

a layer two (L2) customer network; a provider backbone bridged network (PBBN); and a multi-homed provider bridge network (PBN) having a plurality of L2 switches that bridges L2 packets from the customer networks to the PBBN, wherein the plurality of L2 switches are coupled to the customer network via a plurality of links, wherein a first one of the L2 switches comprises:

an interface to receive L2 packets from the PBBN, wherein the L2 packets are encapsulated with virtual local area network (VLAN) tags of a first backbone VLAN within the PBBN;

a packet-forwarding engine (PFE) configured to bridge the L2 packets from the first backbone VLAN and forward the L2 packets to the customer network via the PBN when a first one of the physical links is operational, wherein the PFE is configured to forward the L2 packets from the first backbone VLAN to a second one of the L2 switches of the PBN via a second backbone VLAN when the first one of the physical links is non-operational, and wherein the packet-forwarding engine is programmed to constrain L2 learning to prevent updating MAC tables based on MAC address of the L2 packets when forwarding the L2 packets via the second backbone VLAN.

18. The network system of claim 17, wherein the L2 packets comprises an Ethernet frames.

* * * * *